Patented June 24, 1952

2,601,293

UNITED STATES PATENT OFFICE 2,601,293

POLYMERIZATION INITIATION SYSTEMS COMPRISING A HYDRAZONE, A PEROXY COMPOUND, AND CUPRIC ION

Edward G. Howard, Jr., Wilmington, Del., assignor to E. I. du Pont de Nemours & Company, Wilmington, Del., a corporation of Delaware No Drawing. Application April 1, 1950, Serial No. 153,483

16 Claims. (Cl. 260—63)

This invention relates to a process for the addition polymerization of polymerizable organic compounds, and more particularly, to a new polymerization catalyst system.

The polymerization of polymerizable ethylenic unsaturated compounds has achieved great importance. Hitherto the polymerization of vinyl, vinylidene, acrylyl, alkacrylyl, and diene monomers has commonly been catalyzed or, more properly speaking, initiated, by such compounds as benzoyl peroxide and potassium persulfate. Conventional polymerization systems require relatively high temperatures to initiate polymerization and to give high rate of conversion of the monomeric unsaturate to the polymer. The use of elevated temperatures often leads to products of inferior qualities. In some instances where appreciable rates of polymerization have been achieved at lower temperatures, the product has superior qualities which are of substantial economic importance, such as, for example, the increased abrasion resistance of synthetic rubbers prepared at low temperatures. Accordingly new and improved processes of low temperature addition polymerization in high conversions are of considerable interest.

This invention has as an object the provision of new initiator compositions. A further object is the provision of new polymerization processes employing such systems. Another object is the provision for low temperature polymerization processes. Other objects will appear hereinafter.

These objects are accomplished by the present invention wherein an ethenoid monomer i. e., an ethylenically unsaturated monomer, subject to addition polymerization is polymerized by bringing said monomer in contact with a hydrazone, a peroxidic oxidizing agent, and a solution of cupric copper. In a preferred embodiment the hydrazone has the formula

RNHN=CR'R'' wherein R is an acyl or hydrocarbon radical and R' is hydrogen or a hydrocarbon radical while R'' is a hydrocarbon radical.

The following examples in which parts are by weight are illustrative of the invention.

Example I

A glass container was charged with 50 parts of water, 44 parts absolute ethanol, 13.2 parts of acrylonitrile, 5.7 parts of 3% aqueous hydrogen peroxide, 0.47 part of cyclohexanone phenylhydrazone, and 0.016 part of cupric chloride. After flushing with oxygen-free nitrogen, the container was sealed. After four hours at 0° C., the polymer was collected by filtration, washed with alcohol-water mixture, and dried in a vacuum oven. There was obtained 2.7 parts of polymer corresponding to a 20% conversion.

Example II

When the general procedure of Example I was repeated, except that the hydrazone consisted of 0.44 part of acetone benzoylhydrazone, there was obtained a 68% yield of polymeric acrylonitrile in one hour at 25° C.

Example III

When the general procedure of Example I was repeated, except that the hydrazone consisted of 0.53 part of acetone benzenesulfonylhydrazone, a 70% conversion of monomer to polymer was obtained.

Repetition of this example with the exception that silver nitrate was substituted for the cupric chloride resulted in no polymerization in two hours. Similarly, when cobaltous sulfate was substituted for the cupric chloride, no polymerization occurred in two hours.

Example IV

When the general procedure of Example I was repeated except that the hydrazone was cyclohexanone benzoylhydrazone and 0.61 part of 1-hydroxycyclohexylhydroperoxide was employed in the place of the hydrogen peroxide, a 51% yield of polymer was obtained in one hour.

Example V

The general procedure of Example I was repeated except that 0.60 part of acetophenone benzoylhydrazone was used as the hydrazone and 0.9 part of a 30% solution of diacetyl peroxide was used as the peroxide. In one hour at 28° C. a 74% conversion of monomer to polymer occurred.

Example VI

A glass container was charged at 0° C. with the following: 56 parts of absolute alcohol, 39 parts of water, 0.53 part of acetone benzenesulfonylhydrazone, 5.7 parts of 3% aqueous solution of hydrogen peroxide, 5 parts of an aqueous solution containing 0.016 part of cupric chloride and 20 parts of vinyl chloride. The vinyl chloride was permitted to evaporate until 15.6 parts remained in the container at which time the container was closed and the contents permitted to remain for three hours at 25° C. The polymer obtained was collected by filtration and amounted to 10.1 parts corresponding to a 65% conversion.

*Example VII*

When the general procedure of Example VI was repeated except that the hydrazone consisted of 0.47 part of cyclohexanone phenylhydrazone, a 52% conversion of monomer to polymer took place in six hours at 0° C.

*Example VIII*

The general procedure of Example VI was repeated except that 0.44 part of acetone benzoylhydrazone was used as the hydrazone. After 24 hours at 25° C. a 39% conversion of monomer to polymer occurred.

*Example IX*

The general procedure of Example VI was repeated except that 0.6 part of acetophenone benzoylhydrazone was employed as the hydrazone and the time of polymerization was six hours at 25° C., a 45% yield of polymer was obtained.

*Example X*

When the general procedure of Example VI was repeated with the exception that 0.69 part of acetophenone benzenesulfonylhydrazone was employed as the hydrazone, there was obtained a 39% conversion in six hours at 25° C.

The process of this invention is of generic applicability to the addition of polymerization of polymerizable ethenoid, i. e., ethylenically unsaturated monomers, i. e., polymerizable compounds having the non-aromatic ethylenic

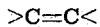

group. Thus, it is applicable to monomeric unsaturated polymerizable compounds in which the unsaturation is due to a terminal ethylenic group which is attached to a negative radical and particularly to vinylidene compounds, including vinyl compounds, which contain the $CH_2=C<$ group. This constitutes a particularly preferred type of monomer.

Compounds having a terminal methylene group which are subject to polymerization and copolymerization with the initiator systems of this invention include olefins, e. g., ethylene and isobutylene; acrylyl and alkacrylyl compounds, e. g., acrylonitrile, methyl methacrylate, ethyl acrylate, methacrylic acid, methacrylamide; vinyl and vinylidene halides, e. g., vinyl chloride and vinylidene chloride; vinyl carboxylates, e. g., vinyl acetate and vinyl dimethylacetate; vinylimides, e. g., N-vinylphthalimide; N-vinyllactams, e. g., N-vinylcaprolactam; vinylaryls, e. g., styrene; vinyl heterocycles, e. g., the vinylpyridines; vinyl ketones, e. g., methyl vinyl ketone; and vinyl ethers, e. g., vinyl ethyl ether.

Fluoroethylenes, e. g., vinyl fluoride and particularly the polyfluoroethylenes including tetrafluoroethylene, chlorotrifluoroethylene, and 1,1-dichloro-2,2-difluoroethylene may be polymerized and copolymerized by the process of this invention.

Polymerizable compounds having a plurality of ethylenic double bonds which may be polymerized or copolymerized by the process of this invention include those having conjugated double bonds, e. g., butadiene and 2-chlorobutadiene, and compounds which contain two or more double bonds which are isolated with respect to each other, e. g., ethylene glycol dimethacrylate, methacrylic anhydride, diallyl maleate, and divinyl benzene.

The process is applicable to the copolymerization of one or more polymerizable compounds with compounds which are not per se readily polymerizable, e. g., to the copolymerization of one or more polymerizable monomers with, for example, maleic and fumaric esters. The process is also applicable to the polymerization of polymerizable ethylenic compounds in the presence of chain-transfer agents. This latter type of polymerization has been called "telomerization" and is further described in U. S. 2,440,880.

This invention is applicable to the polymerization of any unsaturated compound subject to addition polymerization by prior techniques. Optimum conditions may vary from monomer to monomer. In general, liquid phase polymerization is desired and normally gaseous monomers such as ethylene require pressure to give sufficiently high concentration for rapid polymerization.

The polymerizations are usually carried at −20° C. to 50° C., and the process of this invention is of particular advantage at these relatively moderate temperatures. Temperatures may be lower; however, the rate of polymerization may be correspondingly low. Higher temperatures may be used in instances where the time of polymerization must be kept at a minimum, e. g., in a continuous polymerization process. In general the time required for substantial polymerization depends on such variables as the specific temperature, concentration, etc., and is generally from 1 to 24 hours although a time of a few minutes in some polymerization systems may result in substantial polymerization. Conventional means may be employed in the polymerization. A liquid medium, such as an emulsion or solution, in which the catalyst system, monomer and diluent are rather uniformly distributed, may be employed. Preferably aqueous systems are used.

The hydrazones which comprise a portion of the polymerization catalyst system are generally easily obtained by the reaction of hydrazine or a suitable hydrazide such as benzoyl- or benzenesulfonyl hydrazide with a suitable carbonyl compound. The reaction is generally carried out in an alcoholic solution in the presence of a trace of acid such as acetic acid at a temperature of up to 50° C. The hydrazones are generally recovered by cooling and crystallization from alcohol. The preparation and properties of hydrazones have been described in the literature, for example, by Curtius et al., J. pr. chem. [2] 50, 295 (1894) and 58, 160 (1898) and by Wolff, Ber. 28, 161 (1895). Hydrazones prepared by the above general procedures and useful in the process of this invention include, in addition to those mentioned in the examples, the following: benzaldehyde benzenesulfonylhydrazone, benzophenone benzenesulfonylhydrazone, isobutyraldehyde benzenesulfonylhydrazone, glucose benzenesulfonylhydrazone, isobutyraldehyde benzoylhydrazone, benzaldehyde benzoylhydrazone, cyclohexanone benzoylhydrazone, cyclohexanonephenylhydrazone, benzaldehyde p-chlorophenylhydrazone, and acetophenone naphthoylhydrazone. The hydrazones particularly effective in the present invention are represented by the formula ANH—N=B wherein A is aryl, aryl matic hydrocarbon radical or an acyl radical derived from an aryl carboxylic or sulfonic acid; R' and R'' are hydrogen or hydrocarbon radicals. Also included within the scope of this invention are compounds where R' and R" form a cyclic ring with the carbonylic carbon. Thus the hydrazones particularly effective are of the formula ANH—N=B wherein A is aryl, aryl CO, or aryl SO₂ and B is a bivalent hydrocarbon radical free from non-aromatic unsaturation and having its two valences stemming from the same carbon.

In the process for polymerizing ethylenically unsaturated compounds, described in this invention, the hydrazone is generally present in amounts from 0.01 to 5% based on the weight of polymerizable monomer.

The cupric copper is present in small amounts, generally in amounts from 0.001 to 20% based on the hydrazine compound present. Suitable sources of the cupric copper as cupric ion are soluble cupric salts such as cupric sulfate and cupric halide. In non-aqueous systems, such as cyclohexane systems for the polymerization of acrylonitrile, organic cupric salts such as copper butyl phthalate may be employed.

The peroxidic oxidizing agents are generally present in the amounts of from 0.1 to 100% of the weight of the hydrazone compound. Examples of such compounds which result in a rapid rate of polymerization at relatively low temperatures include cumene hydroperoxide, tertiary butyl peroxide, sodium peroxide, potassium and ammonium persulfate. Particularly preferred are water-soluble peroxides since aqueous systems are generally employed.

As illustrated in the examples, rapid polymerizations at relatively low temperatures result from the use of the process of this invention.

The term "aryl" is used to designate a monovalent aromatic hydrocarbon radical with its free valence stemming from nuclear carbon. Similarly, an arylsulfonyl radical has an aryl radical joined to an —SO₂— radical. An aracyl radical is a radical RCO where R is an aryl.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the addition polymerization of a polymerizable ethylenically unsaturated monomer, the improvement wherein said monomer is polymerized by bringing the same in contact with an initiator system comprising a hydrazone, a peroxide, and a solution of cupric copper.

2. In the addition polymerization of a polymerizable ethylenically unsaturated monomer, the improvement wherein said monomer is polymerized by bringing the same in contact, in aqueous dispersion, with an initiator system comprising a hydrazone, a peroxide, and cupric ion.

3. In the addition polymerization of a polymerizable terminally ethylenically unsaturated monomer, the improvement wherein said monomer is polymerized by bringing the same in contact, in aqueous dispersion, with a peroxide, cupric ion, and a hydrazone of the class consisting of arylhydrazones, arylcarbonylhydrazones, and arylsulfonylhydrazones, all of oxo compounds which oxo compounds are, apart from one oxo oxygen, hydrocarbon free from non-aromatic unsaturation.

4. In the addition polymerization of a terminally ethylenically unsaturated monomer, the improvement wherein said monomer is polymerized by bringing the same in contact, in aqueous dispersion, with a peroxide, cupric ion, and the arylhydrazone of an oxo compound which is, apart from one oxo oxygen, hydrocarbon and free from non-aromatic unsaturation.

5. In the addition polymerization of a terminally ethylenically unsaturated monomer, the improvement wherein said monomer is polymerized by bringing the same in contact, in aqueous dispersion, with a peroxide, cupric ion, and the arylcarbonylhydrazone of an oxo compound which is, apart from one oxo oxygen, hydrocarbon and free from non-aromatic unsaturation.

6. In the addition polymerization of a terminally ethylenically unsaturated monomer, the improvement wherein said monomer is polymerized by bringing the same in contact, in aqueous dispersion, with a peroxide, cupric ion, and the arylsulfonylhydrazone of an oxo compound which is, apart from one oxo oxygen, hydrocarbon and free from non-aromatic unsaturation.

7. An initiator composition for the initiation of the polymerization of ethylenically unsaturated monomers subject to addition polymerization comprising a hydrazone, a peroxide, and a cupric compound soluble in water.

8. An initiator composition for the initiation of the polymerization of ethylenically unsaturated monomers subject to addition polymerization comprising a peroxide, a copper compound yielding cupric ion in water solution, and a hydrazone of the class consisting of arylhydrazones, arylcarbonylhydrazones, and arylsulfonylhydrazones, all of oxo compounds which oxo compounds are, apart from one oxo oxygen, hydrocarbon and free from non-aromatic unsaturation.

9. An initiator composition for the initiation of the polymerization of ethylenically unsaturated monomers subject to addition polymerization comprising a peroxide, a copper compound yielding cupric ion in water solution, and an arylhydrazone of an oxo compound which is, apart from one oxo oxygen, hydrocarbon and free from non-aromatic unsaturation.

10. An initiator composition for the initiation of the polymerization of ethylenically unsaturated monomers subject to addition polymerization comprising a peroxide, a copper compound yielding cupric ion in water solution, and an arylcarbonylhydrazone of an oxo compound which is, apart from one oxo oxygen, hydrocarbon and free from non-aromatic unsaturation.

11. An initiator composition for the initiation of the polymerization of ethylenically unsaturated monomers subject to addition polymerization comprising a peroxide, a copper compound yielding cupric ion in water solution, and an arylsulfonylhydrazone of an oxo compound which is, apart from one oxo oxygen, hydrocarbon and free from non-aromatic unsaturation.

12. In the addition polymerization of a polymerizable ethylenically unsaturated monomer, the improvement wherein said monomer is polymerized by bringing the same in contact, in aqueous dispersion, with an initiator system comprising a peroxide, cupric ion, and acetophenone benzoylhydrazone.

13. In the addition polymerization of a polymerizable ethylenically unsaturated monomer, the improvement wherein said monomer is polymerized by bringing the same in contact, in aqueous dispersion, with an initiator system comprising a peroxide, cupric ion, and cyclohexanone benzoylhydrazone.

14. In the addition polymerization of a polymerizable ethylenically unsaturated monomer, the improvement wherein said monomer is polymerized by bringing the same in contact, in aqueous dispersion, with an initiator system comprising a peroxide, cupric ion, and cyclohexanone phenylhydrazone.

15. In the addition polymerization of a polymerizable ethylenically unsaturated monomer, the improvement wherein said monomer is polymerized by bringing the same in contact, in aqueous dispersion, with an initiator system comprising a peroxide, cupric ion, and acetone benzoylhydrazone.

16. In the addition polymerization of a polymerizable ethylenically unsaturated monomer, the improvement wherein said monomer is polymerized by bringing the same in contact, in aqueous dispersion, with an initiator system comprising a peroxide, cupric ion, and acetone benzenesulfonylhydrazone.

EDWARD G. HOWARD, Jr.

REFERENCES CITED

The following references are of record in the file of this patent:

UNITED STATES PATENTS

| Number | Name | Date |
| --- | --- | --- |
| 2,380,476 | Stewart | July 31, 1945 |
| 2,405,950 | Hanford | Aug. 20, 1946 |
| 2,439,528 | Roedel | Apr. 13, 1948 |